Oct. 9, 1934.   W. F. HOWARD   1,976,072
METHOD AND MEANS FOR PREVENTING CHATTERING OF SLENDER WORK
Filed March 25, 1931   4 Sheets-Sheet 1

Inventor:
Wilson F. Howard

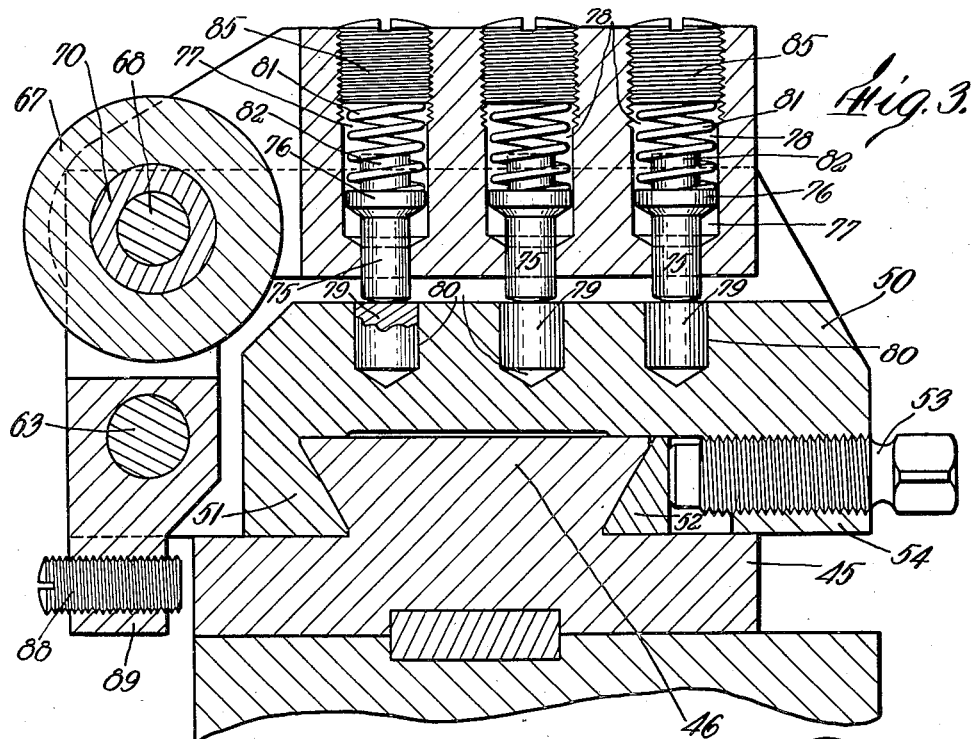

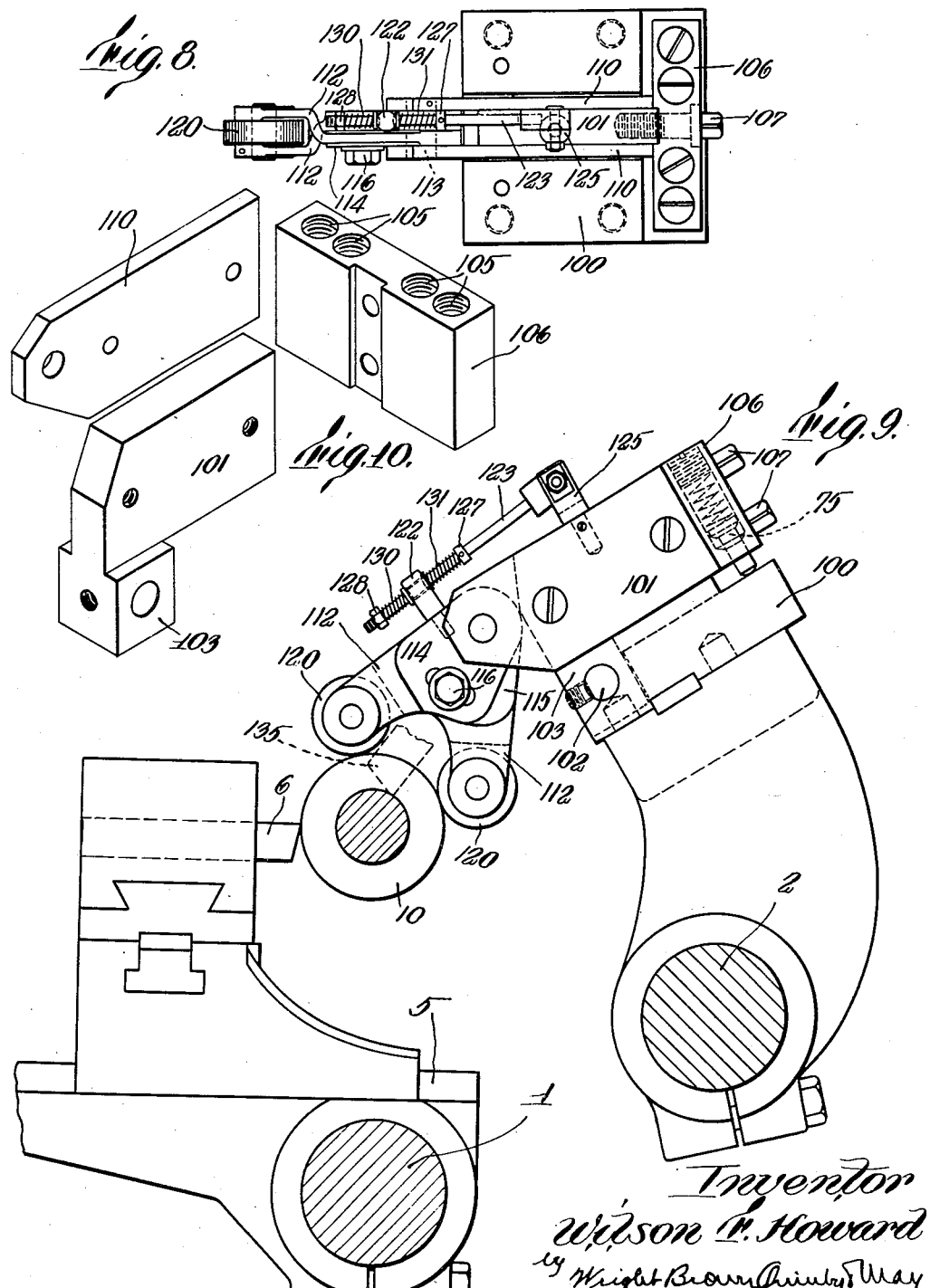

Oct. 9, 1934.  W. F. HOWARD  1,976,072

METHOD AND MEANS FOR PREVENTING CHATTERING OF SLENDER WORK

Filed March 25, 1931  4 Sheets-Sheet 4

Inventor
Wilson F. Howard
by Wright, Brown, Quinby & May
Attys.

Patented Oct. 9, 1934

1,976,072

UNITED STATES PATENT OFFICE 1,976,072

METHOD AND MEANS FOR PREVENTING CHATTERING OF SLENDER WORK

Wilson F. Howard, Springfield, Vt., assignor to Jones & Lamson Machine Company, Springfield, Vt., a corporation of Vermont Application March 25, 1931, Serial No. 525,079

14 Claims. (Cl. 82—25)

When relatively slender work is being machined in a lathe and the cutting action is somewhat remote from the ends which are supported in the machine, pressure between the work and tool may cause the work to bend, resulting in vibration or chattering which causes the cut to be rough.

In some machines, for example, in lathes of the Fay type and for certain work it may be impossible or inconvenient to use a steady rest within which an intermediate portion of the work is positively journaled in order to prevent such chattering. In the Flanders Patent No. 1,368,252, February 15, 1921, is shown a work rest applicable to a Fay lathe for preventing such vibration or chattering, this work rest taking the place of the usual rear tool carrier and being provided with bearing rollers positively positioned in proper relation to take the thrust on the work caused by the pressure between the tools on the front tool carrier and the work.

The present invention has for an object to retain the benefits of the Flanders construction and at the same time to permit the use of tools on a back tool carrier as well as on the front tool carrier. Its principles, however, may be applicable to other machines, as I have discovered that chattering may be prevented by exerting a pressure on the work in a general direction opposing the thrust between the tools and the work without requiring that the work be rigidly supported, a linear contact being ordinarily sufficient. As applied to the Fay lathe the work support of this invention may be carried by one of the tool carriers, this work rest being so mounted that it is held against the work under yielding pressure, this permitting the tool carrier to be given motions to feed the tools relative to the work while permitting the rest to accommodate itself automatically to the work without any attention being paid thereto, provided the tool motion is not excessive.

For a more complete understanding of this invention, reference may be had to the accompanying drawings in which Figure 1 is a fragmentary top plan partly in section showing the work and its end supports and the tool carriers and the intermediate work support as arranged in a Fay lathe.

Figure 3 is a section to a larger scale on line 3—3 of Figure 1.

Figures 4 to 7 inclusive are perspectives of parts of said intermediate support.

Figure 8 is a plan view showing a modified construction.

Figure 2:
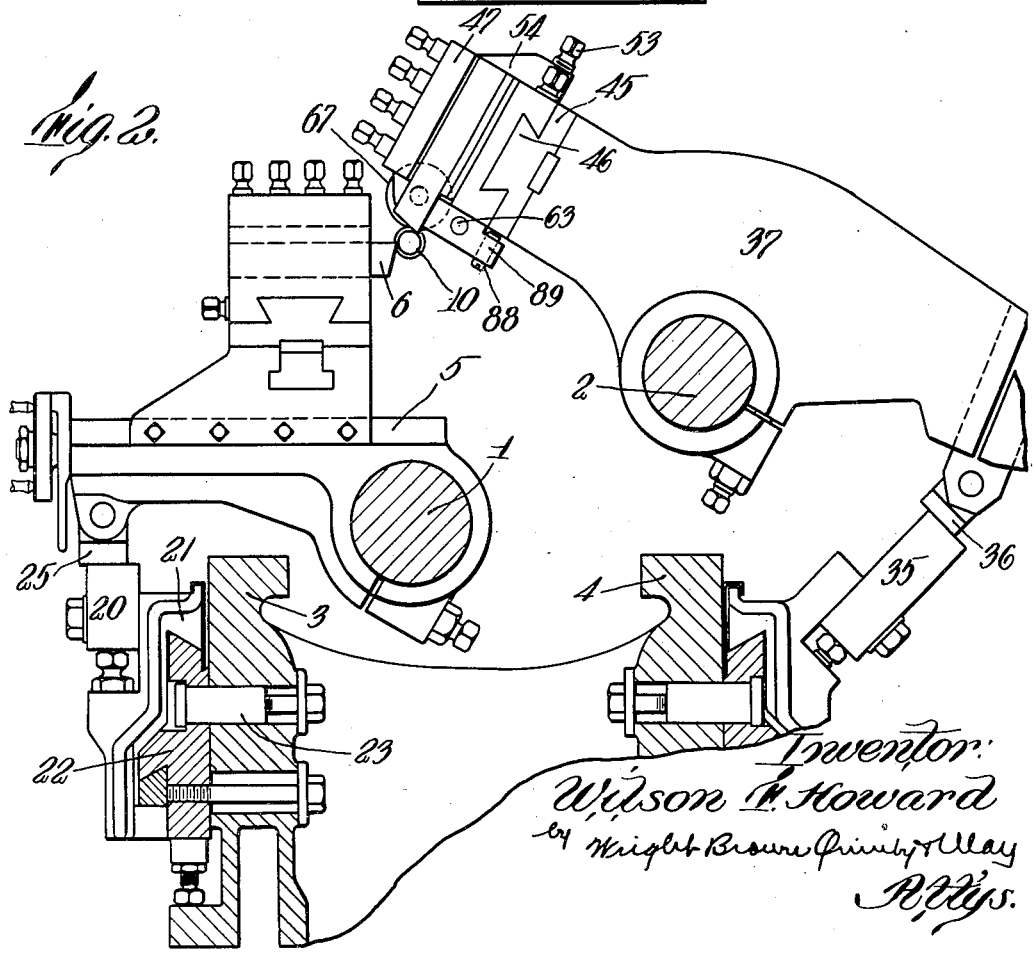
Figure 2 is a fragmentary cross section through a Fay lathe provided with the intermediate work support, the tool carriers being shown in end elevation.

Figure 9 is a view similar to a portion of Figure 2 but to a larger scale and showing the modification of Figure 8.

Figure 10 is a detail in perspective of certain of the parts shown in Figures 8 and 9.

Figure 11:
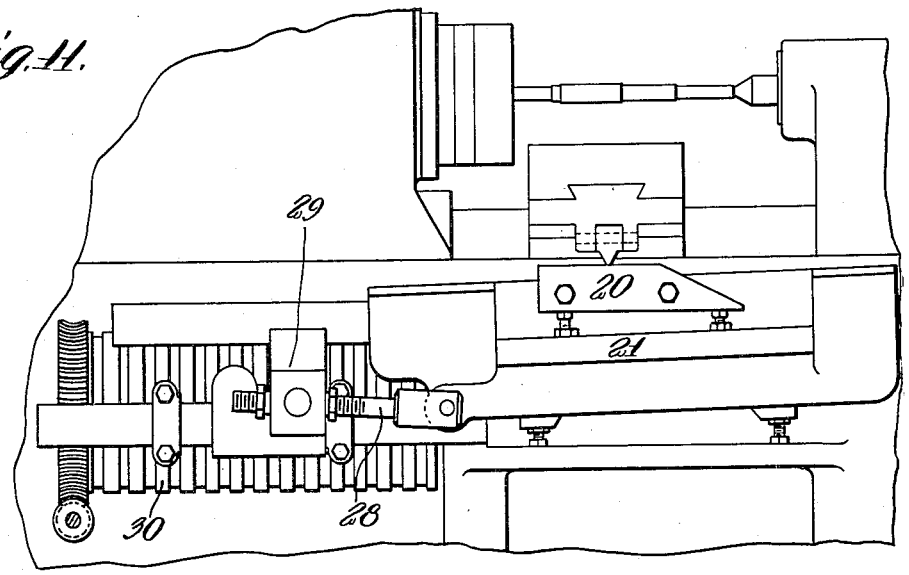
Figure 12:
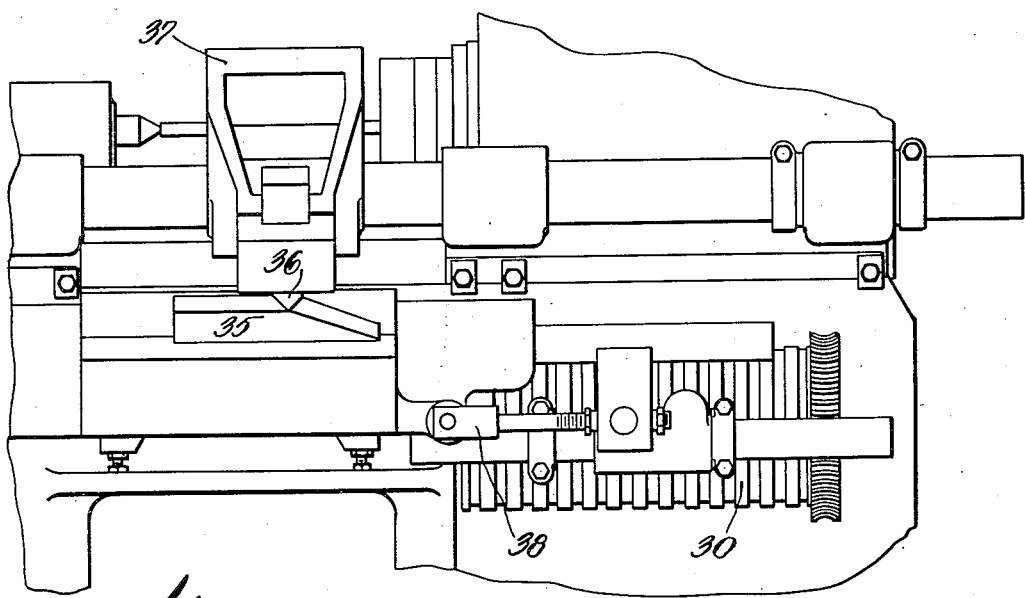

Figures 11 and 12 are fragmentary front and back elevations of the lathe showing the controlling mechanism for the tool and work support carriers.

Figure 1:
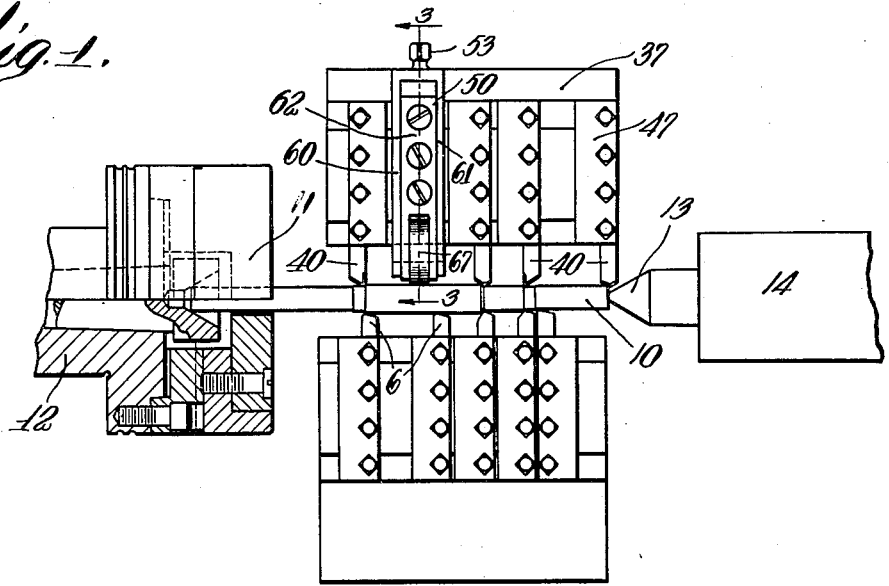

In Figure 2 is shown a fragmentary vertical section through a lathe of the well known Fay type provided with axially movable and rockable tool bars 1 and 2, the tool bar 1 being arranged between the front and rear walls 3 and 4, respectively, of the machine frame, and the bar 2 being arranged above the wall 4. The bar 1 has fixed thereto a tool carrier 5 supporting one or more tools such as 6, Figure 1 showing five of these tools arranged along the work which is shown in these Figures at 10. This work is supported in any suitable manner in the machine, Figure 1 showing it as supported at one end in a chuck 11 which is carried by the usual work spindle 12, and its other end supported by a center 13 carried by the tailstock 14. The angular position of the tool carrier 5 may be controlled by the cam follower 20, shown best in Figure 11, adjustably mounted on a slide 21 carried by a guide 22 angularly adjustable with reference to the wall 3 about a pivot 23. The carrier 5 is provided with a shoe 25 which rests on the upper face of the traversing cam 20 so that the angular position of the front tool carrier may be changed by moving this traversing cam as by moving the cam carrier 21. This may be done through suitable connections such as at 28 with a cam follower on a carriage 29 which coacts with suitable cams secured to the outer face of a main cam drum 30. In a similar manner the angular position of the rear tool bar 2 may be controlled by a traversing cam 35 supporting a shoe 36 on the rear tool carrier 37, this traversing cam 35 being mounted on a carrier similarly to the front traversing cam 20, the axial position of this cam 35 being controlled through the bar connections 38 from suitable cams also carried by the cam drum 30. One or both of the bars 1 and 2 may also be given axial movements by other cams carried by the cam drum 30. This is all in accordance with the usual construction of the well known Fay lathe.

The back tool carrier 37 is shown as supporting tools 40 in the well known manner. This back tool carrier also carries the work rest employed to prevent the work 10 from chattering, due to its relatively slender configuration, where it is rigidly supported at widely spaced points as by the chuck 11 and the center 13.

This work rest or support is shown best in Figures 3 to 6. The upper face of the back tool carrier has keyed thereto, as shown best in Figures 2 and 3, a block 45 provided with a dovetail guide member 46 on its upper face. This member 46 may be used to support the tool holders 47 carrying the tools 40 and it may also be used to carry a support 50. This support 50 has a dovetail portion 51 mating the forward edge of the member 46 and a wedge block 52 may be clamped against the opposite face of this member 46 by means of a set screw 53 threaded through a depending portion 54 of the support 50. By this means the support 50 may be locked in any desired position longitudinally of the member 46. As shown best in Figure 6, this support 50 has a pair of spaced side walls 60 and 61 extending upwardly and forwardly therefrom. Between these side walls is pivoted an arm 62, the pivot at 63 passing through a hole 64 in the arm 62 and opposed holes 65 in the wall portions 60 and 61. Above this pivotal connection the arm 62 is provided with a slot at 66 within which is journaled a work-engaging roll 67, this roll being mounted for rotation on a pin 68 fixed in alined perforations 69 in the arm 62, this journal pin extending through a bushing 70 in the roller 67. This roller 67 is so positioned as to press upon the work engaging the work with a line contact whenever the tools of the back tool carrier are in engagement therewith and to press on the work in a direction in general opposing the resultant thrust thereon of the tools 6 and 40 on the forward and rear tool carriers. Ordinarily the tools 40 are facing or grooving tools which take relatively light cuts, while the tools 6 take the heavy cuts so that the thrust of the tools 40 is of relatively small moment in determining the direction of the resultant thrust of the tools on the work. The roller 67 is, however, held with resilient pressure instead of being in fixed position as usual with steady rests or fixed with relation to the tool the thrust from which it is intended to take, this resilient pressure enabling it to yield as the rear tool bar is rocked to feed the tools into the work. This resilient pressure may be produced by suitable spring means and as shown these comprise a series of plungers 75 each having a head 76 slidable within a counterbored portion 77 of a hole 78 formed through the arm 62 at right angles to its pivot 63. Each of these plungers 75 bears at its lower end against a hardened plug 79 seated in a drilled socket 80 in the upper face of the support 50, and it is pressed against this wear plate by means of a coil spring 81 engaging about a central boss 82 of the plunger and reacting against a plug 85 threaded into the upper end of the hole 78. The several springs 81 tend to raise the outer end of the arm 62 thus to push forwardly and downwardly on the work-engaging roller 67 so that this is held in engagement with the work whenever the rear tool bar is in position to present its tools in operative relation to the work. A stop screw 88 threaded through the depending forward extremity 89 of the arm 62 may be used to limit the upward motion of the rear end of the arm 62. This work-engaging roll 67 traverses along the surface of the work with the traverse of the tools 40, provided the rear tool bar be given a traversing motion, as is sometimes desired, and it exerts sufficient pressure on the work in a direction generaly opposing the thrust of the tools thereon to prevent chattering of the work.

It has been found in practice that no great pressure is required for this purpose and that no definite amount of such pressure within wide limits is necessary, so that as the rear tool carrier is rocked to bring the rear tools deeper into the work, thus increasing the pressure of the roller 67 on the work between or at one side of the tools, no disadvantageous results are produced in the effect of the pressure roll to prevent chattering.

In some cases it may be found desirable to apply the pressure at points spaced angularly about the axis of the work. A construction by which this may be accomplished is illustrated in Figures 8, 9 and 10. In this construction the rear tool carrier has fixed thereto the support 100 to which is pivoted the arm 101 (see Figure 4), the pivot 102 extending through a depending portion 103 at the forward end of this arm. At the rear end of this arm are suitable sockets 105 in a block 106 secured as by bolts 107 to the rear end of the arm 101 for the reception of the spring plungers 75 which bear on the support 101, these being mounted as shown in Figure 3. The arm 101 has fixed to opposite sides thereof, bars 110 which have their forward ends at 111 extended forwardly of the arm 101 to form spaced walls between which is pivoted at 113 the rear ends of levers 112. These levers have overlapping portions 114 and 115 which may be secured together in desired angular relation as by means of the bolt and slot connections at 116. At the forward ends of each of these arms 12 is positioned a work-engaging roller 120. These rollers 120 bear on the work at angularly spaced points, the spacing being dependent on the relative angular adjustment of the levers. One of these levers has fixed thereto a boss 122 through which passes a rod 123 pivoted at its rear end to a boss 125 secured to the arm 101. This rod 123 has fixed thereto a collar 127 and on its forward extremity is threaded a nut 128. Between the nut 128 and the post 122 and between the post 122 and the collar 123 are positioned coil springs 130 and 131 which tend to center the boss 122 between the collar and the nut, thus to determine the angular position of the levers 114 and 115 as a unit about the pivot 113 so that the work-engaging rollers 120 may be yieldingly held in position to bear with substantially equal pressure on the work.

Variations in the angular position of the tool bar 2 are taken care of by the rocking of the arm 101 about its pivot 102, this arm being urged in an angular direction to press the rollers 120 against the work by spring pressed plugs 75.

While the work rest is shown as used in conjunction with tools on the rear tool carrier in the form shown in Figures 1 and 2 it may, of course, be used alone on the rear tool carrier where no tools supported thereby are desired. Likewise one or more tools may be supported on the rear tool carrier in addition to the work rest shown in Figures 8 and 9, if desired, such a tool being indicated in dotted lines at 135 in Figure 9. The forward tool bar 1 is shown in this figure as supporting tools such as 6 in the same manner as is shown in Figure 2.

From this description of certain embodiments of this invention, it should be evident to those skilled in the art that various other changes and modifications might be made without departing from the spirit or scope of this invention as defined by the appended claims.

I claim:
1. In combination, means for rotatably supporting relatively slender work at points spaced axially thereof, a tool positioned between said supports in operative relation to the work, a work rest bearing on the work in a single line contact between said supporting means and spaced there- from, and means for yieldingly pressing said rest against the work and relative to the tool in a general direction opposed to the thrust between the tool and work and with sufficient force to prevent chattering of the work due to such thrust as the work is rotated.

2. In combination, means for rotatably supporting relatively slender work at points spaced axially thereof, a tool positioned between said supports in operative relation to the work, a single freely rotatable roller bearing on the work between said supporting means and spaced therefrom, and means for yieldingly pressing said roller against the work and relative to the tool in a general direction opposed to the thrust between the tool and work and with sufficient force to prevent chattering of the work due to such thrust as the work is rotated.

3. In combination, head and tailstocks, means carried by said head and tailstocks for rotatably supporting end portions of relatively slender work, tool carriers movably supported to bring tools thereon into or out of operative relation to said work, and a work support on one of said carriers and on the same side of the work as the tools on said one carrier for engaging said work in position to oppose the resultant thrust of the tools on the work.

4. In combination, head and tailstocks, means carried by said head and tailstocks for rotatably supporting end portions of relatively slender work, tool carriers rockably supported to bring tools thereon into or out of operative relation to said work, and a work support on one of said carriers and on the same side of the work as the tools on said one carrier for engaging said work in position to oppose the resultant thrust of the tools on the work.

5. In combination, head and tailstocks, means carried by said head and tailstocks for rotatably supporting end portions of relatively slender work, tool carriers rockably supported to bring tools thereon into or out of operative relation to said work, a work support on one of said carriers on the same side of the work as the tools thereon for engaging said work in position to oppose the resultant thrust of the tools on the work, and means for yieldingly pressing said support against the work when the tools on said one carrier are in operative relation to the work.

6. In combination, a lathe having head and tailstocks for rotatably supporting relatively slender work at its end portions, rockable tool bars arranged substantially parallel to the work, certain of said bars being also axially movable, means for controlling the axial and angular positions of said bars, tool carriers fixed to each bar for supporting tools in position to be brought into and out of operative relation to the work on rocking of said bars, and a roller yieldingly supported on one of said carriers in position to press on the work while a tool on its carrier is in operative relation to the work and in a direction to prevent chattering of the work from the action of tools on said carriers thereon.

7. A device of the class described comprising a support attachable to a tool carrier, an arm pivoted to said support, a work-engaging roller journaled on said arm, and spring pressed plungers carried by said arm and engaging said support, for yieldingly holding a portion of said arm spaced from said support.

8. A device of the class described comprising a support attachable to a tool carrier, an arm pivoted to said support, a work-engaging roller journaled on said arm, spring pressed plungers carried by said arm and engaging said support, for yieldingly holding a portion of said arm spaced from said support, and a stop for limiting such spacing.

9. In combination, means for rotatably supporting relatively slender work at spaced points, a rockable bar arranged substantially parallel to the work, a tool in operative relation to the work, a support carried by said bar, an arm pivoted to said support, a work engaging element carried by said arm, spring means between said arm and support for pressing said element against the work in a direction to oppose the thrust of the tool on the work and with sufficient pressure to prevent chattering of the work in one angular position of said bar, and means for controlling the angular position of said bar.

10. In combination, means for rotatably supporting relatively slender work at spaced points, a tool positioned to act on the work between said points, and means for producing yielding single line contact pressure against the work in a direction to oppose the thrust between the tool and the work and with sufficient force to prevent the work from chattering.

11. A device of the class described comprising a support, an arm pivoted to said support, jaw members each pivoted at one end to said arm, a work engaging element carried by the free end of each jaw, means for yieldingly holding said jaws in predetermined angular relations to said arm, and spring means between a portion of said arm and said support.

12. The method of preventing chattering of slender work rotatably supported in engagement with a cutting tool, which comprises applying yielding single line contact pressure to the work opposing the thrust between the tool and the work.

13. In combination, means for rotatably supporting relatively slender work at spaced points, a tool, a carrier for said tool rockably supported to move said tool toward and from the work, a tool mounted for operation on the work angularly spaced from said first mentioned tool, and a work support yieldingly carried by said carrier for motion relative to said first mentioned tool in position to apply yielding pressure to the work opposing the thrust of said tools throughout the range of movement of said carrier during which its tool is in operative relation to the work.

14. In combination, means for rotatably supporting relatively slender work at lengthwise spaced portions, tool carriers movably supported to bring tools thereon into and out of operative relation to said work between said portions, tools on said carriers, and a work support yieldingly carried by one of said carriers and relative to the tool thereon and bearing on the work with a yielding pressure in a general direction opposed to the thrust between the tools and the work and with sufficient force to prevent chattering of the work as it is rotated.

WILSON F. HOWARD.